United States Patent Office 3,533,998
Patented Oct. 13, 1970

3,533,998
POLYESTERS AND POLYAMIDES BEARING PENDANT QUATERNARY AMMONIUM GROUPS
Seymour Yolles, Fairfax, Wilmington, Del., assignor to E. I. du Pont de Nemours and Company, Wilmington, Del., a corporation of Delaware
No Drawing. Filed June 8, 1967, Ser. No. 644,501
Int. Cl. C08g *17/14, 20/30, 20/32*
U.S. Cl. 260—65        4 Claims

ABSTRACT OF THE DISCLOSURE (A) Polyesters and polyamides bearing pendant quaternary ammonium groups, useful as antistatic agents and as initiators for the preparation of (B) novel polymers derived from 2,2-substituted hydroxy propionic acids and 2,2-substituted propiolactones, also useful as antistatic agents.

The polyesters and polyamides have recurring units represented by the structure

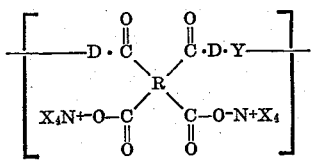

and

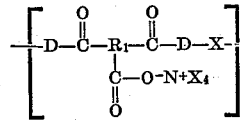

where
R is a tetravalent organic radical of at least 6 carbon atoms,
$R_1$ is

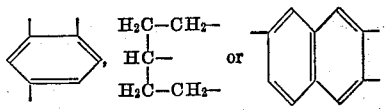

X is alkyl or benzyl,
Y is alkylene, alkylene ether, arylene ether, polyalkylene ether, phenylene, arylene or cycloalkylene, and
D is oxygen or

The polymers derived from 2,2-substituted hydroxy propionic acids and 2,2-substituted propiolactones hav recurring units represented by the structures

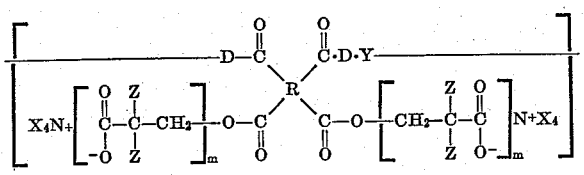

and

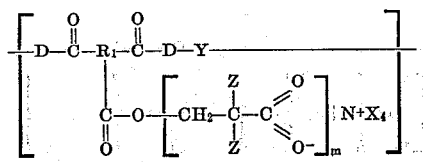

where
R, X, D and Y are as above,
$R_1$ is

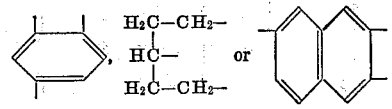

Z is hydrogen or alkyl of 1–10 carbon atoms, and
$m$ is 10–5000.

SUMMARY OF THE INVENTION

This invention relates to polyesters and polyamides bearing pendant quaternary ammonium radicals. It is more particularly directed to polyesters and polyamides having recurring units represented by the structures (1)

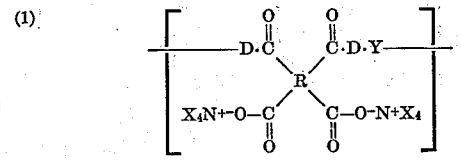

and

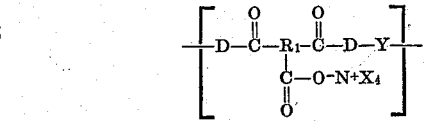

where
R is a tetravalent organic radical having at least 6 carbon atoms,
$R_1$ is

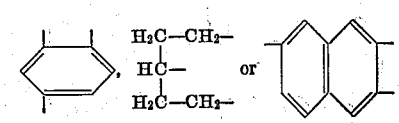

X is a linear or branched alkyl radical of 1 through 18 carbon atoms or benzyl, (usually only one of X is benzyl),
D is oxygen or

and
Y is phenylene, cycloalkylene of up to 20 carbon atoms, a linear or branched

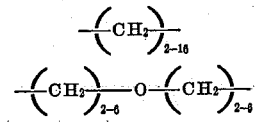

or

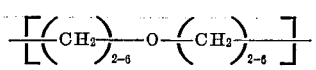

radical.

The invention is also directed to polymers derived from 2,2-substituted hydroxypropionic acids and 2,2-substituted propiolactones. These polymers have recurring units represented by the structures (2)

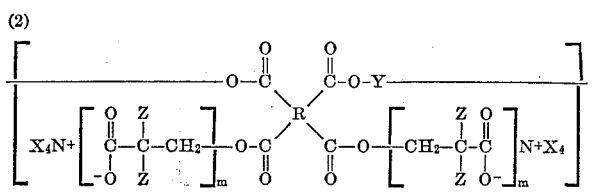

and

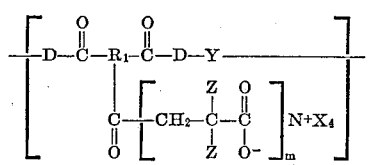

where

R, $R_1$, D, X and Y are defined as in Formula 1,
Z is hydrogen or an alkyl radical of 1-10 carbon atoms, and
$m$ is 10-5000.

In Formulae 1 and 2, the R group, because it bears four carboxyl groups, can accept the various moieties attached to it in configurations other than that shown. These moieties may be in any position relative to each other, e.g., 1,2; 1,3; or 1,4 when R is phenyl.

Illustrative of the R groups in Formulae 1 and 2 are

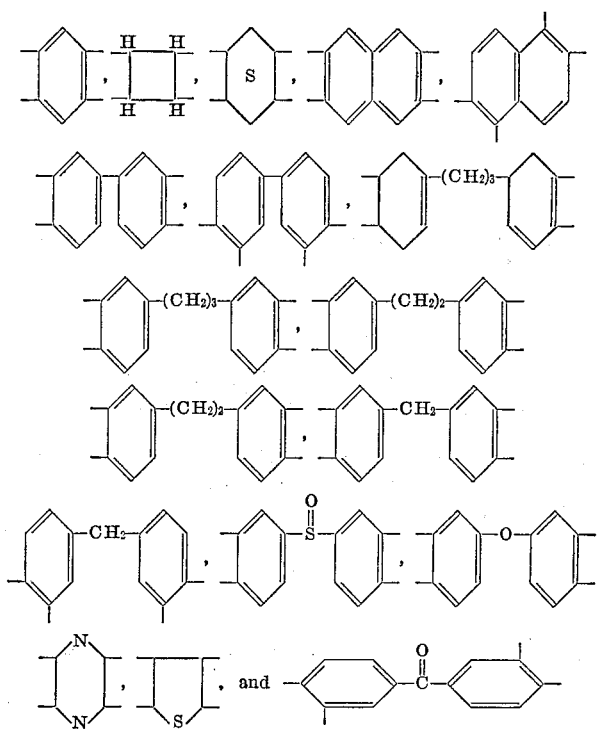

The polyesters and polyamides of Formula 1 can be made by reacting a dianhydride with an alkanediol, a diamine, an alkyl ether glycol or a polyether glycol according to the general and illustrative equation (3)

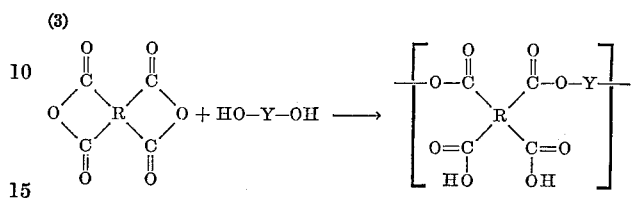

The carboxyl groups in the resulting polyester can then be neutralized with a tetraalkyl ammonium- or trialkylbenzylammonium hydroxide.

Illustrative of the dianhydrides which can be used are trimellitic anhydride
pyromellitic dianhydride
2,3,6,7-naphthalene tetracarboxylic dianhydride
1,2,5,6-naphthalene tetracarboxylic dianhydride
3,3',4,4'-diphenyl tetracarboxylic dianhydride
2,2',3,3'-diphenyl tetracarboxylic dianhydride
2,2-bis(3,4-dicarboxyphenyl) propane dianhydride
2,2-bis(2,3-dicarboxyphenyl) propane dianhydride
1,1-bis(2,3-dicarboxyphenyl) ethane dianhydride
1,1-bis(3,4-dicarboxyphenyl) ethane dianhydride
bis(2,3-dicarboxyphenyl) methane dianhydride
bis(3,4-dicarboxyphenyl) methane dianhydride (benzene-1,2,3,4-tetracarboxylic dianhydride)
bis(3,4-dicarboxyphenyl) sulfone dianhydride
bis(3,4-dicarboxyphenyl) ether dianhydride
pyrazine-2,3,5,6-tetracarboxylic dianhydride
thiophene-2,3,4,5-tetracarboxylic dianhydride and
3,4,3',4'-benzophenone tetracarboxylic dianhydride.

Illustrative of the diamines which can be used are hexamethylene diamine
phenylene diamine
4,4'-diaminodiphenyl ether
4,4'-methylene-bis-(cyclohexylamine) and
2,3,5,6-tetrachloro p-xylene-$\alpha,\alpha'$-diamine.

Illustrative of the alkanediols, alkyl ether glycols and polyether glycols which can be used are ethylene glycol
1,3-propanediol
1,4-butanediol
1,6-hexanediol
trans,trans-1,4-cyclohexanediol
2,2,4,4-tetramethyl-1,3-cyclobutanediol
polyethylene glycol (molecular weight 106-4000)
polypropoylene glycol (molecular weight 134-4000)
polytetramethylene glycol (molecular weight 162-5000).

The reaction shown in Equation 3 is run by slurrying equimolar amounts of an anhydride and an alkanediol, diamine, alkyl ether glycol or polyester glycol in an organic liquid such as xylene, methylethyl ketone, cyclohexanone or tetrahydrofuran. The reaction proceeds quickest if the dianhydride reactant is soluble in the organic liquid; tetrahydrofuran is preferred for this reason.

This slurry is stirred and heated for about two hours at reflux temperature. The progress of the reaction can be followed by periodically determining the acid number of the reaction mass. When the theoretical acid number is reached, the reaction is complete. The molecular weight of the product can be controlled by introducing an excess of either reactant, which acts as a chain stopper.

The resulting polyester is a colorless to light yellow viscous liquid or gum which can have a molecular weight ranging from about 500 into the hundreds of thousands. In substantially pure form, the product is a mixture of polymers having different molecular weights.

This polyester precursor is then treated with a quaternary ammonium hydroxide by dissolving or dispersing it in water or an alcohol such as methanol and then titrating this with a solution of quaternary ammonium hydroxide in alcohol or water to an end point of pH 9–10. The polyester of Formula 1 can be recovered from this by evaporating the liquid. The product is a substantially pure colorless to light yellow semi-solid. Its molecular weight is about the same as the polyester precursor.

The polyesters and polyamides of Formula 1 are useful as initiators for the polymerization of 2,2-substituted hydroxypropionic acids and 2,2-substituted propiolactones to give polymers of Formula 2. The polymerization can be carried out by first preparing a 1–2%, (by weight) solution of a Formula 1 polyester in hexane or benzene and then dripping in the acid or lactone monomer, with stirring. A polymer of Formula 2 precipitates.

The polyesters and polyamides of Formula 1 are especially useful as initiators for polymerizing these acid or lactone monomers from the vapor phase, an efficient technique for coating articles with a Formula 2 polymer. To do this, one simply impregnates or coats the object to be coated with a 0.5% to about 20%, (by weight) solution of the polyester initiator in water or tetrahydrofuran, allows it to dry and then exposes it to monomer vapor at a temperature of from 10 to 100° C. for from 15 to 300 minutes. The Formula 2 polymer forms in situ, coating the object with a smooth and continuous film.

This vapor phase technique can also be used to give various types of fibers smooth continuous coatings of Formula 2 polymers. Paper made from such coated cellulose fibers, when hot pressed, becomes bonded at points of fiber intersection to give a rigid inert sheet useful as battery separators, siding, and the like. Asbestos fibers coated in this way can be similarly pressed into ceramic-like articles, and wool becomes shrinkproof and dimensionally stable. Hair treated in this fashion retains a preformed curl.

The polyesters and polyamides of Formula 1 are also useful as initiators for the solvent- or fludized bed deposition of Formula 2 polymers. The initiator is applied as before to the object to be coated; this object is then suspended in an inert liquid such as hexane or benzene, or in a fluidized bed. Acid or lactone monomer liquid or vapor is then passed in. The polymerization proceeds as before to give a coating of the Formula 2 polymer.

This solvent- or fluidized bed technique is particularly useful for coating metal and metal oxide pigments, especially aluminum flake and titanium dioxide. Such metallic pigments, when used in outdoor paints, sometimes cause staining of the finish when exposed portions of the pigment react with acids or bases in the atmosphere. A polymeric coating, easily provided by the method just described, shields the pigments from exposure to the atmosphere and so provides stain-free finishes.

The polymers of Formulae 1 and 2 are also useful as antistatic agents. Fibers and fabrics which are prone to develop high electrostatic charges, especially when there is little moisture in the air, will retain little or no charge if they are treated with a polymer of Formula 1 or 2. The fabrics or fibers can be treated by simply immersing them in a 0.5% to 5% solution of a polymer in a solvent such as water or methanol, and then drying them.

Preferred for their initiating ability in the solvent-, fluidized bed- or the vapor-phase polymerization, and for their antistatic properties, are polymers having recurring units represented by the structures

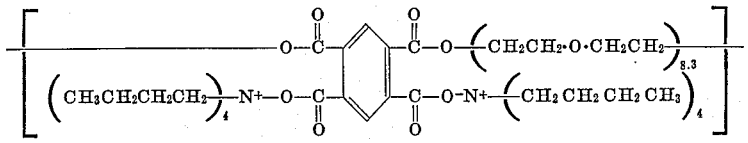

and

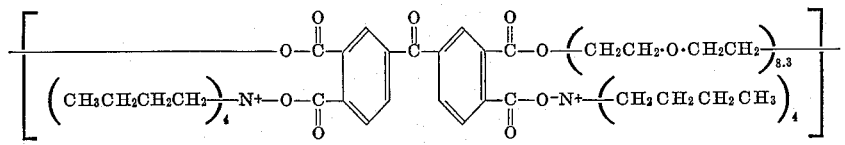

DESCRIPTION OF PREFERRED EMBODIMENTS

Example 1

A solution of 10.9 parts of sublimed recrystallized pyromellitic dianhydride in 50 parts of anhydrous tetrahydrofuran was prepared. This solution was then added to a solution of 30 parts of dried "Carbowax" 600 [1] in 115 parts of tetrahydrofuran.

The resulting solution was heated to 68° C. and stirred for nine hours under nitrogen. The tetrahydrofuran was then distilled off, leaving behind 43 parts of light-yellow residue.

This residue was dissolved in 150 parts of methanol and titrated with a 25% solution of tetrabutyl ammonium hydroxide in methanol to an end point of pH 9.1. The methanol was then removed at reduced pressure, leaving behind 67 parts of a yellow semi-solid polyester having recurring units represented by the structure

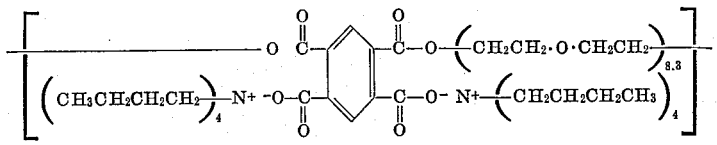

Example 2

A solution of 32.2 parts of benzophenone tetracarboxylic dianhydride in 50 parts of anhydrous tetrahydrofuran was prepared. This solution was then added to 60 parts of dried "Carbowax" 600 dissolved in 115 parts of tetrahydrofuran.

The resulting solution was heated to 68° C. and stirred for nine hours under nitrogen. The tetrahydrofuran was then distilled off, leaving behind a light-yellow residue.

This residue was dissolved in 150 parts of methanol and titrated with a 25% solution of tetrabutyl ammonium hydroxide in methanol to an end point of pH 9.5. The methanol was then removed at reduced pressure, leaving

---

[1] A polyethylene ether glycol having a molecular weight of about 600, sold by Union Carbide Co.

behind a polyester having recurring units represented by the structure

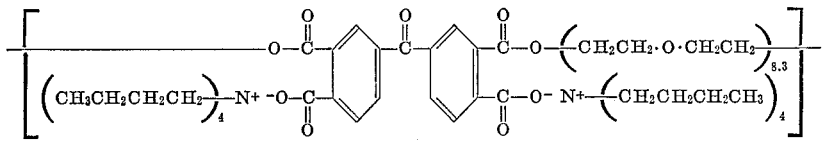

Example 3

The procedure of Example 1 was repeated, using 21.8 parts of pyromellitic dianhydride instead of 10.9 parts and using 95 parts of polytetramethylene ether glycol (molecular weight about 950) in place of the "Carbowax" 600.

The resulting product was titrated to an end point of pH 9.5 with tetrabutyl amomnium hydroxide to give a light-yellow semi-solid polyester having recurring units represented by the structure

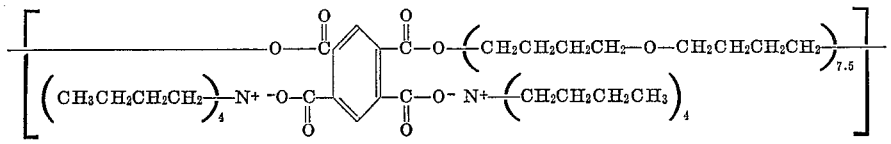

Example 4

Fifty parts of dried crysotile asbestos were blended in an Osterizer with 800 parts of a 5% aqueous solution of the polyester of Example 1. The asbestos fibers were then removed from the slurry by filtration, washed twice with water and then sucked dry on a filter funnel. The fibers were then dried for 24 hours at 70° C. The weight gain was about 1%.

These dried fibers were then fluffed in an Osterizer, placed in an open dish and the dish placed in a desiccator containing pivalolactone. The pressure was then reduced to about 20 mm.

After 66 hours, the fibers were removed from the desiccator and heated at 70° C. for about 1 hour. The product showed a weight gain of about 1.4%.

Electronmicrographs of the fibers showed they were encapsulated with a polymer. This polymer had recurring units of the structure

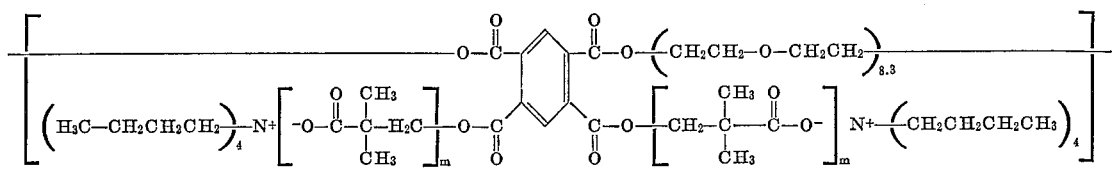

Its molecular weight was 30,000–60,000.

Test bars 0.108 inch thick, made by compression molding this product at 225° C., showed the following characteristics:

Tensile at break—4548 p.s.i.
Elongation at break—1.5%
Modulus—402,843 p.s.i.

Example 5

Three parts of "Orlon" Acrylic Fiber®, dried to constant weight, were soaked in a 5% aqueous solution of the polyester of Example 1. The fibers were separated from the solution by filtration and then dried. They showed an 11.8% increase in weight.

These fibers were then exposed to pivalolactone vapor in a desiccator at a pressure of 20 mm. After 30 minutes, the fibers were removed from the desiccator and dried at 70° C.

These polymer coated fibers were more resistant to hypochlorite bleach and to yellowing on laundering than the same fibers left untreated.

Example 6

A 4 inch by 4 inch square of "Dacron" Polyester Fiber® taffeta was soaked for ten minutes in a 5% aqueous solution of the Example 1 polyester. The taffeta was then wrung out, air dried for 20 minutes and then dried at 60° C. for 30 minutes. The fabric showed a weight increase of about 2.5%.

A static charge placed on this fabric dissipated much more rapidly than did a charge placed on an untreated control. This antistatic property was largely lost on laundering.

The fabric was then placed in a desiccator containing pivalolactone, and a vacuum of 20 mm. of mercury was drawn. After one hour of exposure, the vacuum was released and the fabric removed and heated at 60° C. for 10 minutes. The fabric showed a weight gain of 2.3%.

A static charge placed on this fabric also dissipated much more rapidly than did a charge placed on an untreated control. This antistatic property was left largely unaffected by laundering.

Example 7

One hundred parts of Alcoa grade 216 aluminum flake were washed in acetone, dried and then slurried in 200 parts of benzene. This slurry was then mixed with a solution of 200 parts of a 9% benzene solution of the polyester of Example 3. The aluminum flake was then filtered from the liquid and dried.

The flake was resuspended in 400 parts of benzene, and 20 parts of pivalolactone were slowly dripped in, with stirring, over a two-hour period. The flake was then filtered from the solution.

The resulting paste was incorporated into an automotive lacquer. This lacquer, applied to a metal panel and dried, gave a finish having improved resistance to staining by acids and bases.

Example 8

Ninety parts of a long fiber kraft wood pulp slurry containing 6.8 parts of wood were washed with 500 parts of a 4% aqueous solution of the polyester of Example 1. The fibers were then removed from the liquid by filtration, dried and fluffed.

These fibers were then placed in a desiccator containing pivalolactone, which was then evacuated to 20 mm. of pressure. The fibers were allowed to remain in this atmosphere for 48 hours and were then removed and dried.

Paper hand sheets (50 lbs. per ream) were prepared from these polymer-coated fibers by standard paper making techniques. The sheets had good wet strength but rather poor dry strength. Pressing several sheets together at 423° F. and 32,000 lbs. ram pressure for 30 seconds gave a well-bonded laminate which was impervious to water and did not weaken or disintegrate when soaked in dilute hydrochloric acid for 2 to 3 days.

Example 9

Hair on a plastic curler was treated with a 1% solution of the polyester of Example 1, was allowed to dry overnight, and was then exposed to pivalolactone vapors in a vacuum desiccator. After 30 minutes, the hair showed a 0.8% weight gain. When removed from the curler, the hair retained the impressed wave. In water, this curl relaxed somewhat but retained about 50% of the original wave.

Example 10

A sample of virgin wool, dried to constant weight, was washed with a 4% aqueous solution of the polyester of Example 1. The wool was then dried in a vacuum oven overnight at 55°, and exposed to pivalolactone monomer in a desiccator at a pressure of 20 mm. of mercury.

The tactile properties of the wool thus treated were indistinguishable from the untreated wool, and in addition was shrink-proof and had dimensional stability.

I claim:

1. A polymer consisting essentially of the recurring unit $$\left[\begin{array}{c} \overset{O}{\underset{\|}{D-C}} \overset{O}{\underset{\|}{C-D-Y}} \\ R \\ X_4N^+O-C \quad C-O-N^+X_4 \\ \overset{\|}{O} \quad \overset{\|}{O} \end{array}\right]$$

or $$\left[\begin{array}{c} \overset{O}{\underset{\|}{D-C}}-R_1-\overset{O}{\underset{\|}{C-D-Y}} \\ \underset{\|}{C-O-N^+X_4} \\ O \end{array}\right]$$

where R is

[structures shown]

or

[structure shown]

$R_1$ is

[structures shown]

X is an alkyl radical of 1 through 18 carbon atoms or benzyl,

D is oxygen or $$-\overset{H}{N}-$$

both D units being the same in each polymeric unit and

Y is phenylene, cycloalkylene of up to 20 carbon atoms, $$-(CH_2)_{2-16}-, \text{ or } -[(CH_2)_{2-6}-O-(CH_2)_{2-6}]-$$

2. A polymer according to Formula A in claim 1, wherein R is

[structure shown]

D is O, Y is $$-(CH_2-CH_2-O-CH_2-CH_2)_{8.3}-$$

and X is $-(CH_2CH_2CH_2CH_3)$.

3. A polymer according to Formula A in claim 1 wherein R is

[structure shown]

D is O, Y is $$-(CH_2CH_2-O-CH_2CH_2)_{8.3}-$$

and

X is $-(CH_2CH_2CH_2CH_3)$.

4. A method for reducing the receptivity of a fiber to an electrostatic charge, said method comprising coating or impregnating said fiber with a polymer according to claim 1.

References Cited

UNITED STATES PATENTS

| | | | |
|---|---|---|---|
| 3,053,783 | 9/1962 | Broadhead et al. | 260—29.2 |
| 3,108,085 | 10/1963 | Broadhead | 260—22 |
| 3,242,136 | 3/1966 | Endrey | 260—47 |

WILLIAM H. SHORT, Primary Examiner

L. L. LEE, Assistant Examiner

U.S. Cl. X.R.

117—126, 132, 138.8, 141, 142, 148, 155; 260—292, 30.2, 33.4, 47, 75, 78, 468, 475, 485, 501.15